J. Williamson,
Steam-Engine Piston.
Nº 368. Patented Aug. 31, 1837.
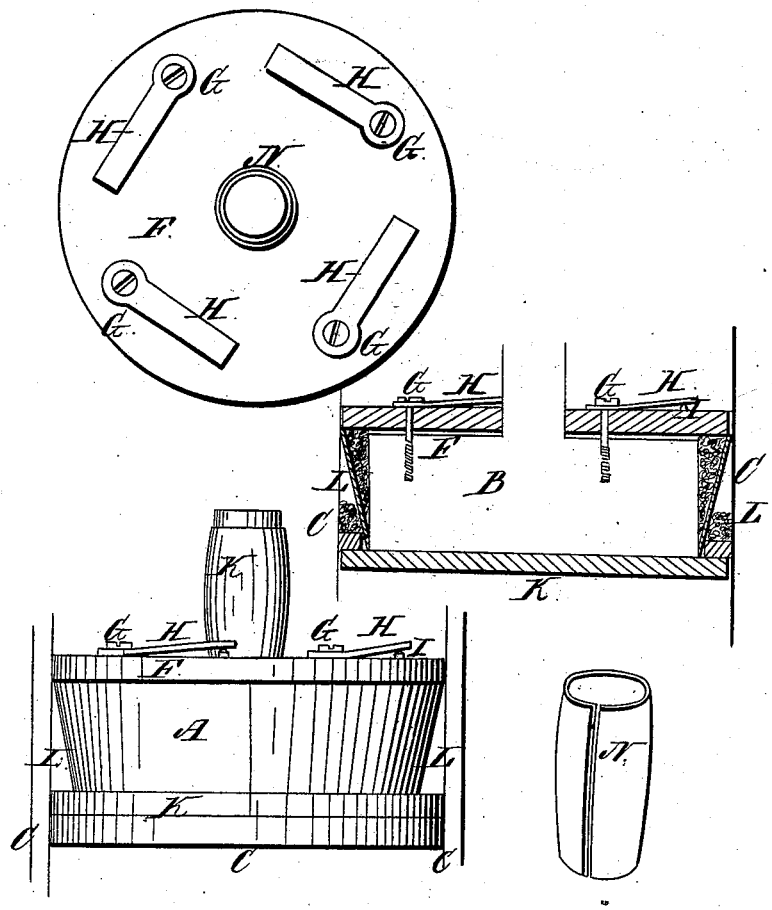

UNITED STATES PATENT OFFICE.

JOHN WILLIAMSON, OF NEW YORK, N. Y.

MODE OF PACKING THE PISTONS OF STEAM-ENGINES.

Specification of Letters Patent No. 368, dated August 31, 1837.

*To all whom it may concern:*

Be it known that I, JOHN WILLIAMSON, of the city, county, and State of New York, have invented a new and useful Improvement in the Mode of Packing Steam-Engines, which is described as follows, reference being had to the annexed drawings of the same, making part of this specification.

The nature of my invention consists in providing a copper hoop A, of an inverted conical shape, placed around the piston B, so that its lower edge, or smaller diameter, shall touch the outside of the piston, and its larger diameter shall touch the inside of the cylinder C, thus leaving a triangular space D between the hoop and piston, which is filled with hemp, or other suitable substance, E, and is pressed down so as to extend the upper edge of the hoop from the piston and cause it to fit the inside of the cylinder closely by means of a circular movable plate F, placed upon the packing and over the head of the piston, to which it is attached by means of four screw rods, G G G G, passing through round apertures in the plate and screwed into the piston; and to which rods four stout steel springs H H H H are fastened, bearing upon steel points I inserted into the outside of the movable circular plate for pressing it down hard upon the packing and causing it constantly to dilate or extend the copper hoop in the manner before mentioned. Around the lower edge of the piston is put a circular copper ring K of such diameter as to fill the space between the piston and cylinder, leaving another triangular space, L, above the ring and upper outer edge of the hoop, which is also filled with packing L.

The hoop and ring are both divided across the diameter, forming semi-circles to admit of being extended, for more effectually filling the space between the piston and cylinder. The ring and hoop may be divided on one side only.

The aperture in the head of the cylinder through which the piston rod works is packed with a copper ring such as is represented at N.

The invention claimed by me, the said JOHN WILLIAMSON, and which I desire to secure by Letters Patent consists in—

The before described method of packing pistons of steam engines, by the use and application of the conical hoop A; ring K; packing L; springs H; and packing ring N; in combination with the other parts, which are not claimed.

JOHN WILLIAMSON.

Witnesses:
WM. P. ELLIOT,
OWEN CONNOLLY.